Figure 1:
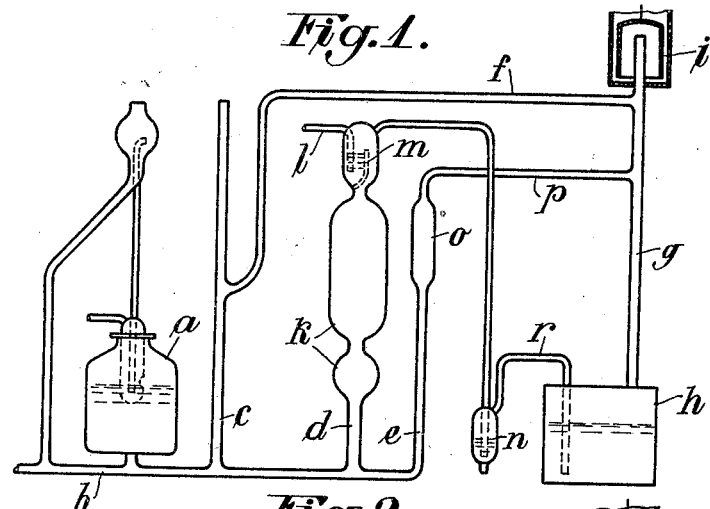

O. RODHE.
AUTOMATIC GAS ANALYZING APPARATUS.
APPLICATION FILED JAN. 26, 1920.

1,351,129. Patented Aug. 31, 1920.

Inventor
Olof Rodhe
By Knight Bros
atty.

UNITED STATES PATENT OFFICE.

OLOF RODHE, OF STOCKHOLM, SWEDEN, ASSIGNOR TO SVENSKA AKTIEBOLAGET MONO, OF STOCKHOLM, SWEDEN, A CORPORATION.

AUTOMATIC GAS-ANALYZING APPARATUS.

1,351,129.

Specification of Letters Patent.    Patented Aug. 31, 1920.

Application filed January 26, 1920.   Serial No. 354,283.

*To all whom it may concern:*

Be it known that I, OLOF RODHE, chief engineer, citizen or subject of the King of Sweden, residing at Odengatan 54A, Stockholm, Sweden, have invented certain new and useful Improvements in Automatic Gas-Analyzing Apparatus, of which the following is a specification.

In registering gas analyzing apparatus, where the composition of the gas is determined on the principle of first measuring the gas in one measuring vessel, and then passing it through an absorption vessel, wherein the gas to be measured is absorbed, the remainder then being measured in a second counter-vessel; this second vessel is brought in communication with the atmosphere after the completion of each analysis. For the registration, however, a certain pressure is required in the second measuring vessel in making each analysis, in order to obtain the necessary power for making the registration, and to this end part of the gas measured in the first measuring vessel is used for bringing up the pressure to the desirable value. Consequently, in dimensioning the first measuring vessel, due regard must be paid to the clearance spaces in the pipings, the absorption vessel and the second measuring vessel. Evidently, the larger the detrimental spaces are, the greater must be that part of the gas in the first measuring vessel which is employed for effecting the increase of pressure.

If, however, the gas mixture to be analyzed contains principally gas capable of being absorbed in the absorption vessel, a very considerable part of the gas mixture in the first measuring vessel is required for effecting the necessary increase of pressure, and considering a certain relation between the capacity of the clearance spaces, and the percentage of absorbable gases present in the gas mixture, the non-absorbable quantity of gas in the gas mixture will not be sufficient to effect the desirable pressure in the second measuring vessel.

It will be understood that as part of the gas mixture in the first measuring vessel must be utilized to produce the required increase of pressure before a registration of the analysis can be effected, the gas analyzing apparatus as heretofore constructed do not register up to 100%, but only so much less than 100% as corresponds to that part of the gas mixture in the first measuring vessel which is consumed for effecting the necessary increase of pressure.

The present invention has for its purpose to obviate this drawback, and according to the invention the increase of pressure in the absorption vessel and in the second measuring vessel is brought about by introducing into the second measuring vessel a separate gas, which is neutral relatively to the absorbing medium, in such a quantity as to produce the desired increase of pressure, without the gas in the first measuring vessel having to be called for to produce this result. This is attained thereby that a pipe connected directly or indirectly with the absorption vessel or with the second measuring vessel contains a measuring vessel in which on each analysis a certain quantity of gas is measured, said gas quantity being led into the absorption vessel or into the second measuring vessel simultaneously with the gas from the first measuring vessel in such manner that on account thereof the increase of pressure required for the analysis is obtained, without the gas then undergoing any change of volume at all or while the gas, at the most, is subjected to a constant change of volume. Through the present invention a gas analyzing apparatus may thus register as high as 100% which is of the utmost importance in many investigations.

Of course the neutral gas supplied to the absorption apparatus and to the second measuring vessel need not be neutral relatively to the absorbing medium, but the gas may also contain absorbable constituents, provided the gas is of a constant composition, and evidently only the neutral part of the gas will then be active for the purpose aimed at by the invention; in such case however, the measuring vessel for the neutral gas must be dimensioned with respect to the reduction of the strength of the neutral gas by the addition of the absorbable gas. A neutral gas of varying composition may also be used, if it is kept out of contact with the absorption medium, which may be prevented in various ways, for instance by leading the gas directly to the measuring bell, or by using the medium of a sealing liquid etc.

Figure 2:
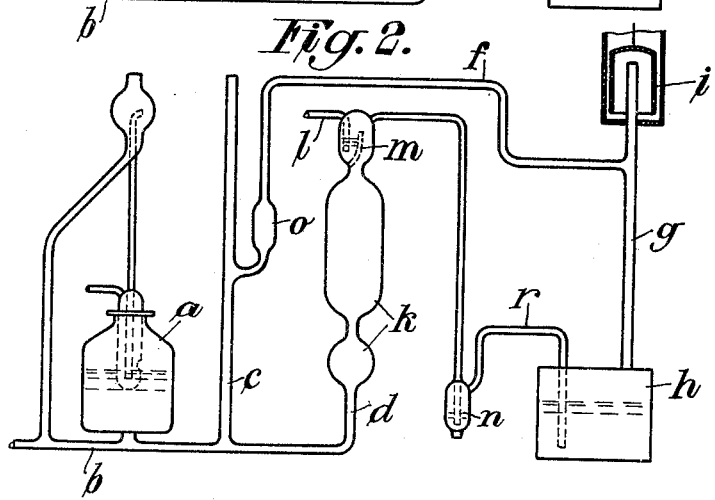
Figure 3:
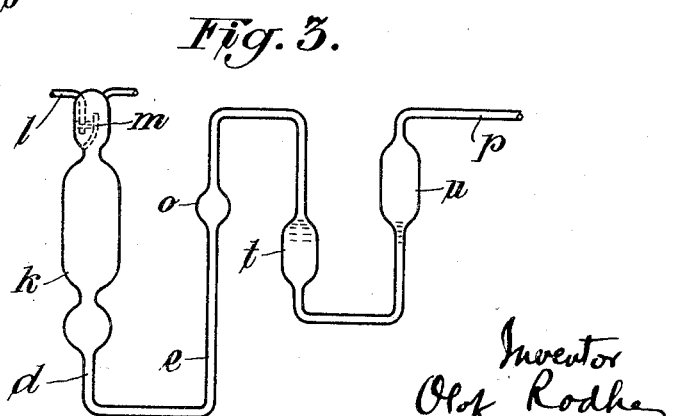

In the accompanying drawing, three embodiments of the invention are shown diagrammatically by way of example, the said embodiments being disclosed by Figures 1, 2 and 3 respectively.

*a* denotes a pump for the operation of the apparatus, which pump is constructed for instance according to the U. S. Patent No. 947533. *b* is a pipe system connected with the pump, while *c*, *d* and *e* designate rising pipes branched off the pipe system *b*. Leading into the rising pipe *c* is a pipe *f* connected at its other end with the pipe *g* between the absorption vessel *h* and the second measuring vessel or bell *i*; after the completion of each analysis and measurement in the bell *i*, the contents of the latter are discharged into the atmosphere through the said pipe *f*.

Pipe *d* leads to the first measuring vessel *k*, into which the gas to be analyzed is sucked in through the pipe *l* and the liquid seal *m*, when the pumping liquid falls, and from which vessel the gas is then pressed into the absorption vessel *h* through the liquid seal *n* on the subsequent rising of the pumping liquid.

Pipe *e* leads into the small measuring vessel *o* arranged according to the present invention, said vessel *o* being connected with the pipe *g* by means of the pipe *p*.

When in the operation of the pump *a*, the pumping liquid/mercury/falls and rises in the pipes *c*, *d* and *e*, gas on account of the movement in *e* will be alternately sucked from the piping *g* into the measuring vessel *o* and then again pressed therefrom to the pipe *g* and the measuring bell *i*. In this case the gas sucked into the vessel *o* will thus be entirely neutral with respect to the contents of the absorption vessel, and consequently this gas can not have any influence whatever on the result of the analysis. The gas will correspond to the composition of the gas after the absorption.

Obviously, the liquid seal *n* may be omitted, the pipe *r* submerged into the absorption liquid then serving as a liquid seal.

In the embodiment according to Fig. 2, the measuring vessel *o* is arranged in the pipe *b*; pipes *e* and *p* may then be omitted. The mode of operation, however, is the same as in Fig. 1.

The measuring vessel *o* may in the same manner as the measuring vessel *k* be provided with a separate intake for air or neutral gas and with a separate outtake *p*.

In the embodiment shown in Fig. 3, the gas is led through pipe *p* to the second measuring vessel through the medium of a sealing liquid in the vessel *t*, communicating with the vessel *u*, to which the sealing liquid is expelled and where the latter will then be passed by the gas.

What I claim as new and desire to secure by Letters Patent of the United States is:—

1. An arrangement in automatic gas analyzing apparatus provided with a primary measuring vessel, an absorption vessel and a secondary measuring vessel, characterized by this that a pipe connected with one of the said two last mentioned vessels contains a measuring vessel in which a certain quantity of gas is measured on each analysis, the said quantity of gas being led into one of said two vessels, simultaneously with the gas from the primary measuring vessel.

2. An arrangement in automatic gas analyzing apparatus provided with a primary measuring vessel, an absorption vessel and a secondary measuring vessel, characterized by this that a pipe connected with a pipe connecting the second measuring vessel and the absorption vessel, contains a measuring vessel in which a certain quantity of gas is measured on each analysis, which quantity is led to said connection pipe simultaneously with the gas from the primary measuring vessel.

In testimony whereof I affix my signature in presence of two witnesses.

OLOF RODHE.

Witnesses:
P. H. BERGROTH,
U. LEIKEL.